(No Model.)

Z. T. BUSH.
LAWN MOWER SHARPENER.

No. 498,219. Patented May 23, 1893.

WITNESSES:
Ada M. Harvey
L. T. Rutherford

INVENTOR
Zachariah T. Bush
BY
Dennis L. Rogers
ATTORNEY.

United States Patent Office.

ZACHARIAH T. BUSH, OF STANTON, MICHIGAN, ASSIGNOR OF ONE-HALF TO HARLOW H. HOWE, OF SAME PLACE.

LAWN-MOWER SHARPENER.

SPECIFICATION forming part of Letters Patent No. 498,219, dated May 23, 1893.

Application filed January 23, 1893. Serial No. 459,494. (No model.)

*To all whom it may concern:*

Be it known that I, ZACHARIAH T. BUSH, a citizen of the United States, residing at Stanton, in the county of Montcalm and State of Michigan, have invented certain new and useful Improvements in Lawn-Mower Sharpeners; and I do hereby declare the following to be a full, clear, and exact description of the invention, such as will enable others skilled in the art to which it appertains to make and use the same.

My invention relates to a lawn mower sharpener. My object is to provide a device for sharpening the edges of the sweeps of lawn mowers, which can be easily and quickly attached and detached to and from the mower and whereby said sweeps may be quickly and uniformly sharpened without removing them from the arms to which they are secured, and it consists in the construction, combination and arrangement of the various parts hereinafter described and now particularly pointed out in the claims reference being had to the accompanying drawings wherein—

Figure 1:
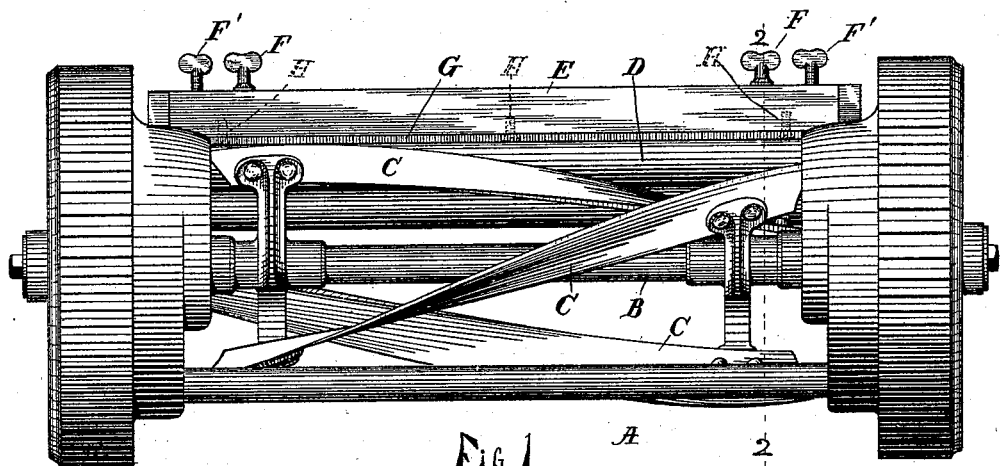
Figure 2:
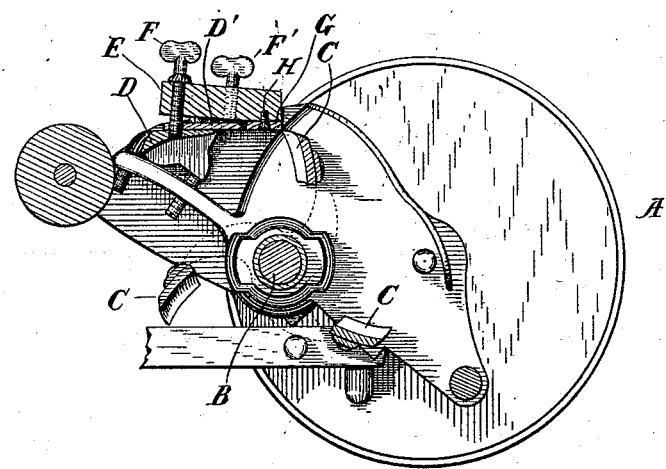

Figure 1 is a front elevation of a lawn mower inverted and having my device thereto attached and Fig. 2 is a vertical cross section of the same.

A represents any ordinary lawn mower having drive wheels, a shaft B. provided with arms to which the sweeps C. are attached and D. a portion of the frame to which the shear plate is attached and D' represents the shear plate which is adapted to co-operate with the sweeps C. for cutting grass.

To the shear plate D' is detachably secured the bar E. of wood or other suitable material by bolts passing through the shear plate and into the frame D and is provided with set screws F', and has the sharpening plate G permanently secured to its under surface along the front margin by screws H. and arranged to project in front of the shear plate D'. It will now be seen that my device consists of the bar E. provided with the bolts F set screws F' and having the sharpening plate G permanently secured upon its under surface near the front margin and that this device is adapted to be quickly and easily attached to any ordinary lawn mower and that when so attached it may be adjusted and maintained in such a position that the edge of the sweeper C. will brush the face of the sharpening plate G: then by having the mower inverted as shown in the drawings and simply drawing it along on the ground causing the sweeps to revolve, the edges of the sweeps will successively be brought into frictional contact with the face of the file plate and thus be successively and uniformly sharpened and when sufficiently sharpened the device may be quickly and easily removed.

What I claim, and wish to secure by Letters Patent of the United States, is—

1. In a lawn mower, a sharpening device, having a sharpening plate, permanently secured to a bar, attached to the shear plate, of said lawn mower; means of adjusting, and provisions for conveniently attaching and detaching said bar; substantially as set forth.

2. The combination with the shear plate of a lawn mower, of a lawn mower sharpener detachably secured to said plate and consisting of a bar E, having secured to its under surface near the front margin a sharpening plate projecting in front of said shear plate and set screws for the adjustment of said sharpening plate arranged substantially as described and for the purposes set forth.

In testimony whereof I affix my signature in presence of two witnesses.

ZACHARIAH T. BUSH.

Witnesses:
GEO. C. PREVETTE,
HARLOW H. HOWE.